(12) United States Patent
Packard

(10) Patent No.: US 8,075,354 B2
(45) Date of Patent: Dec. 13, 2011

(54) ROTOR ENERGY AUGMENTED MARINE VESSEL

(76) Inventor: Thomas G. Packard, Edmonds, WA (US)

( * ) Notice: Subject to any disclaimer, the term of this patent is extended or adjusted under 35 U.S.C. 154(b) by 105 days.

(21) Appl. No.: 12/460,834

(22) Filed: Jul. 23, 2009

(65) Prior Publication Data

US 2010/0022147 A1    Jan. 28, 2010

(51) Int. Cl.
    *B63H 21/20*      (2006.01)
(52) U.S. Cl. ............................................ 440/3; 180/2.2
(58) Field of Classification Search .................. 114/337, 114/338; 440/3; 180/2.2
See application file for complete search history.

(56) References Cited

U.S. PATENT DOCUMENTS

| | | | | |
|---|---|---|---|---|
| 3,826,218 | A | * | 7/1974 | Hiersig et al. ..................... 440/3 |
| 4,403,968 | A | * | 9/1983 | Heidrich et al. ................... 440/3 |
| 6,155,892 | A | * | 12/2000 | Gorlov ............................... 440/9 |
| 6,701,862 | B2 | * | 3/2004 | Hilleman ....................... 114/338 |
| 6,725,797 | B2 | * | 4/2004 | Hilleman ....................... 114/337 |

FOREIGN PATENT DOCUMENTS

SU      1178653 A   *   9/1985

* cited by examiner

*Primary Examiner* — Lars A Olson

(57) ABSTRACT

A marine vessel is constructed with a submerged front rotor/turbine that shields the vessel hull from water motion induced resistance force to a degree without significantly increasing the vessels water resistance while abstracting hydrodynamic energy from the vessel motion displaced water that would otherwise be dissipated/lost and couples or connects the resulting rotorary energy through mechanical or electrical means to assist in driving the vessel.

9 Claims, 3 Drawing Sheets

TANDEM ROTOR/TURBINE

LOW RESISTANCE HULL

ROTOR ENERGY AUGMENTED MARINE VESSEL

BACKGROUND OF THE INVENTION

Energy utilization and cost associated with various moving vehicles is becoming an increasing social/economic and environmental problem The aerodynamic/hydrodynamic energy efficiency of transportation vehicles has not improved significantly in resent times, The proposed invention is thought to be a significant development and elementary air flow vehicle simulation tests indicate the feasibility and validity of the concept. The idea of extracting energy from a generated air/medium flow is generally not a practicable process as the input energy is of course greater than the output energy however if the input energy is not increased in the process and the input energy in the flow is to be lost in total then extracting air/medium flow energy can be practicable.

BRIEF DISCRIPTION OF THE INVENTION

A marine vessel is constructed with a rotor or type of turbine on the submerged bow of the ship/vessel to extract energy from the motion displaced water that would be otherwise be lost. The water resistance against the hull would be decreased by the shield effect of the rotor and the overall water resistance would not be significantly increased as the rotor frontal resistance area would be less or no larger than the hull frontal resistance area without the rotor. This extracted or generated rotary energy is utilized to reduce the net/total energy required to drive the ship/vessel by coupling the energy to the stern drive propeller or propellers.

DETAILED DESCRIPTION OF THE ROTOR ENERGY AUGMENTED MARINE VESSEL

The submerged bow of the vessel/ship has a larger diameter rotor/turbine, FIG. 1 & FIG. 2, that approximately equals or is a little less than the overall frontal hull water resistance area. There may be rotors in tandem FIG. 3. The rotor/turbine is coupled/connected mechanically or electrically or hydraulically to the stern drive propeller system or some other independent drive system. The hull of the rotor/turbine augmented vessel is constructed with modified, reduced frontal area design to reduce water resistance that greater, more efficient, rotor/turbine shielding of the hull allows.

Figure 1:
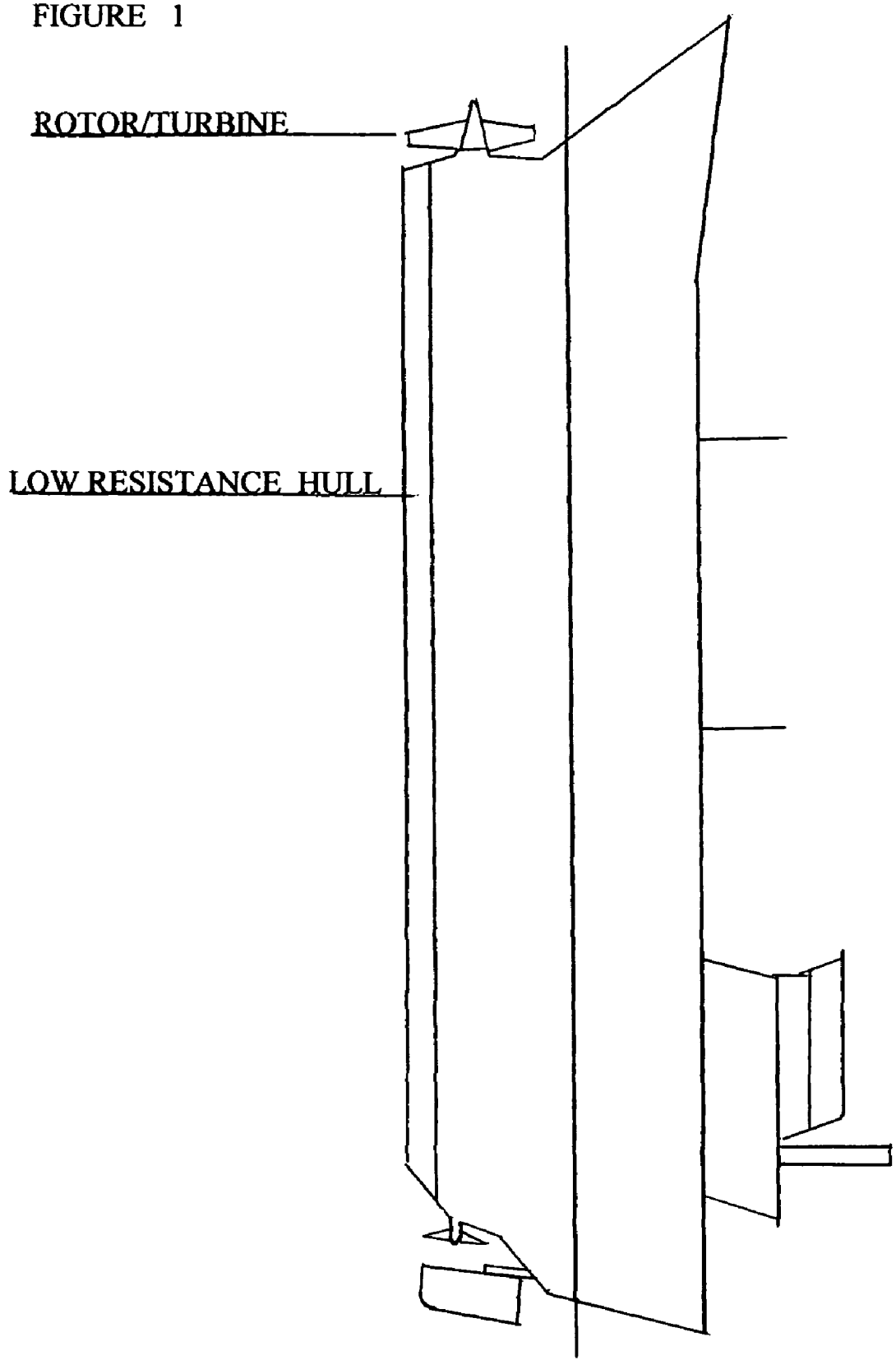
FIG. 1, Side view vessel hull and rotor/turbine.
Figure 2:
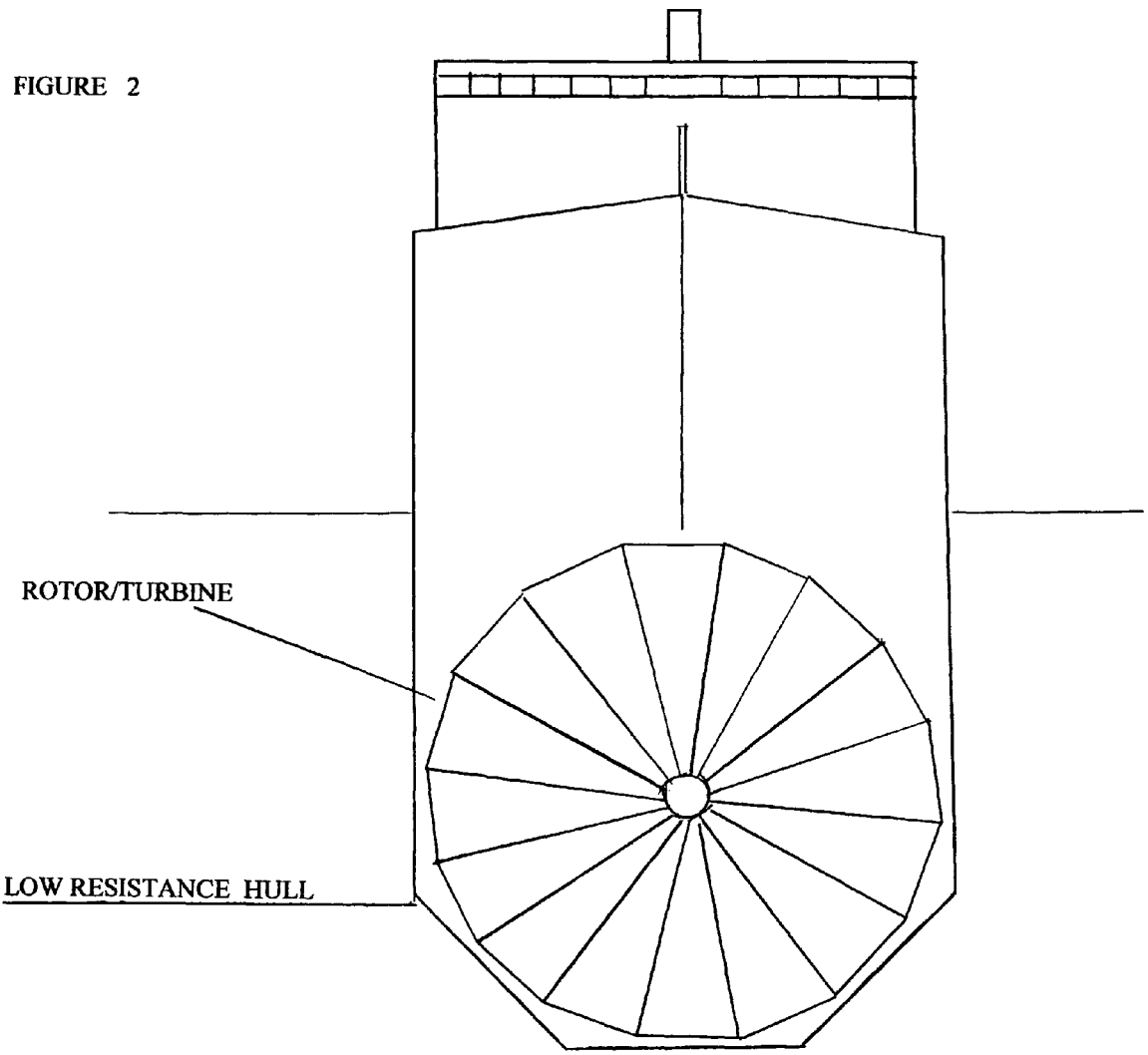
FIG. 2, Frontal view of vessel hull and rotor/turbine.
Figure 3:
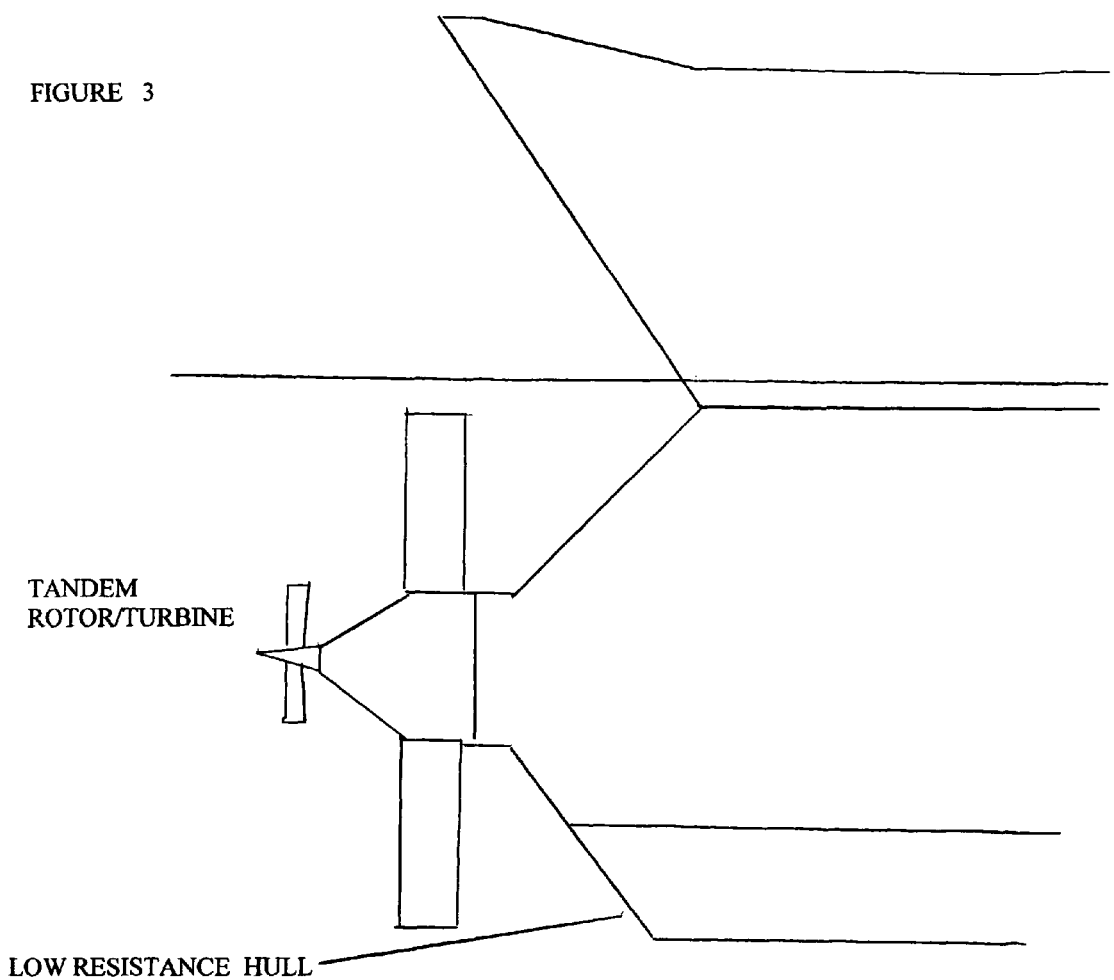
FIG. 3, Tandem rotor/turbine.

The invention claimed is:

1. A marine vessel energy conserving propulsion system comprising a vessel shielding front bow energy collecting turbine/rotor that is constructed to generate mechanical energy from motion generated dynamic water pressure against the turbine/rotor and a coupling or connecting system for propulsion as the vessel moves through the water.

2. The propulsion system of claim 1 wherein the generated energy is coupled to the vessel engine and/or propeller to assist in driving the vessel through the water.

3. The propulsion system of claim 1 wherein the turbine/rotor is a tandem assembly double turbine/rotor.

4. A marine vessel energy conserving propulsion system comprising a front forward vessel hull shielding energy collecting and mechanical energy generating turbine/rotor combined with an energy coupling or connecting system that assists in driving the vessel through the water.

5. A marine vessel with one or more turbine/rotors that can shield the vessel hull from dynamic water pressure and generate mechanical energy from dynamic water pressure and this energy can be further converted into electrical energy that is transmitted for off vessel use or converted into storable energy.

6. A marine vessel energy conserving propulsion system comprising a front bow turbine/rotor that shields the vessel hull from relative motion generated dynamic water pressure acting against and resisting the forward movement of the vessel through the water while collecting and generating mechanical energy from the dynamic water pressure combined with a mechanical and/or electrical and/or hydraulic coupling arrangement whereby the energy is harnessed directly or indirectly to assist in driving the vessel through the water.

7. The marine vessel energy conserving system of claim 6 wherein the mechanical energy is coupled mechanically or mechanically/hydraulically and harnessed directly or indirectly to a vessel driving propeller or propellers.

8. The marine vessel energy conserving propulsion system of claim 6 wherein the collected and generated mechanical energy is converted into electrical energy and coupled/harnessed electrically directly or indirectly to a vessel driving propeller system.

9. A surface marine vessel with a front bow turbine/rotor that shields the vessel hull from relative motion induced dynamic water pressure while collecting and generating mechanical energy that is coupled and harnessed directly or indirectly to assist in driving the vessel through the water.

* * * * *